United States Patent [19]

Tamai

[11] Patent Number: 4,766,774
[45] Date of Patent: Aug. 30, 1988

[54] SHIFT CONTROL METHOD AND APPARATUS FOR AUTOMATIC TRANSMISSIONS USED IN AUTOMOTIVE VEHICLES

[75] Inventor: Hidefumi Tamai, Ebina, Japan

[73] Assignee: Isuzu Motors Limited, Tokyo, Japan

[21] Appl. No.: 897,851

[22] Filed: Aug. 19, 1986

[30] Foreign Application Priority Data

Aug. 29, 1985 [JP] Japan .................. 60-190094

[51] Int. Cl.$^4$ .............. B60K 20/00; B60K 41/18; B60K 20/10
[52] U.S. Cl. ........................ 74/475; 74/335; 74/866
[58] Field of Search ............ 74/335, 475, 866

[56] References Cited

U.S. PATENT DOCUMENTS

| | | | |
|---|---|---|---|
| 4,539,858 | 9/1985 | Takahashi | 74/475 |
| 4,543,856 | 10/1985 | Klatt | 74/866 |
| 4,580,457 | 4/1986 | Ishida et al. | 74/335 |
| 4,625,577 | 12/1986 | Ashikawa et al. | 74/475 |
| 4,646,582 | 3/1987 | Kijima | 74/475 X |

FOREIGN PATENT DOCUMENTS

| | | |
|---|---|---|
| 0130811 | 1/1985 | European Pat. Off. . |
| 0130812 | 1/1985 | European Pat. Off. . |
| 0134646 | 3/1985 | European Pat. Off. . |
| 59-97349 | 6/1984 | Japan .................. 74/335 |

Primary Examiner—Dirk Wright
Attorney, Agent, or Firm—Staas & Halsey

[57] ABSTRACT

At an initial shifting operation of an automatic transmission, a shift actuator is operated to move a shift fork shaft to an initial target gear shift position which is deepest, followed by removing driving force from the actuator. A value is then read in from a stroke sensor for sensing the position of the actuator that prevails when a detent mechanism of the transmission is in a stable state. Shifting control is performed by using the read value as a target value for the next shifting operation.

6 Claims, 2 Drawing Sheets

SHIFT CONTROL METHOD AND APPARATUS FOR AUTOMATIC TRANSMISSIONS USED IN AUTOMOTIVE VEHICLES

BACKGROUND OF THE INVENTION

Field of the Invention

This invention relates to a method and apparatus for controlling the shifting of an automatic transmission in an automotive vehicle. More particularly, the invention relates to a method and apparatus of the type described that make it possible to reliably control the amount of shifting of a shift actuator in a parallel shaft-type gear transmission.

Description of the Belated Art:

In an automatic transmission for an automotive vehicle, gear shifting is performed by a shift actuator operated by hydraulic or pneumatic pressure. For this reason, the completion of the gear shifting operation cannot be sensed by response or the like. Accordingly, a conventional shift control unit is adapted to detect completion of gear shifting by a position sensor, such as a switch in order to prevent a gear shifting abnormality, such as a gear shifting failure or an excessive degree of gear shifting. However, since it is required that the switch such as the aforementioned position sensor be provided at a position where it can be actuated in response to the actual gear meshing state of the transmission, difficulties are involved in selecting the proper position and in mounting the switch at this position. Moreover, since vehicular transmissions are somewhat different from one another because of slight differences in manufacture, the gear shift positions are not always the same from one transmission to another. Consequently, adapting the switch-type position sensor requires a troublesome adjustment for each and every transmission, so that the difference among transmissions is a problem that cannot be dealt with easily.

The applicant has proposed, in Japanese Patent Application No. 59-239125, a shift control unit that operates on a learning principle. A detent mechanism for shift positioning is used to sense the stroke position of a switch actuator at such time that the shift position is in a stable state, with a value indicative of the sensed position serving as a target value for the next gear shifting operation. However, the proposed control unit is not problem-free. Specifically, since a learned gear shift target value does not exist for the first gear shifting operation, reliance is placed upon a set target value for this first operation. This makes it impossible to deal with the aforementioned problem of the discrepancy in gear shifting positions caused by the slight variations in transmission manufacture. There is concern that the transmission will not be placed in gear because of an inadequate gear shifting operation in extreme cases.

Accordingly, an object of the invention is to provide a shifting control method and apparatus in which, in a shift control unit for a vehicular automatic transmission, the shift stroke of each gear stage peculiar to the automatic transmission is detected so that optimum gear shifting control can be performed for each and every transmission.

SUMMARY OF THE INVENTION

According to the present invention, the foregoing object is attained by providing a method of controlling the shifting of an automatic transmission for an automotive vehicle, the method comprising a first step of operating a shift actuator to an initial target gear shift position which is deepest for each gear stage of the transmission at an initial shifting operation of the transmission, a second step of removing driving force from the shift actuator at the end of the first step, a third step executed at the end of the second step of reading in a value from a stroke sensor for sensing a position of the shift actuator in a state where a detent mechanism of the transmission has stabilized, and a fourth step executed at the end of the third step of selecting the read value from the stroke sensor as a target value for the next shifting operation.

The present invention also provides a shift control apparatus in an automatic transmission for an automotive vehicle in which each shift fork shaft for operating a respective clutch sleeve of the transmission is equipped with a shift positioning detent mechanism, the shift control apparatus comprising a shift actuator for actuating the shift fork shaft, a stroke sensor for sensing an operating position of the shift actuator, reading means for reading in a value from the stroke sensor that prevails in a state where the detent mechanism has stabilized, this being performed after the shift actuator moves the shift fork shaft for each gear stage to an initial target gear shift position which is deepest at an initial shifting operation of the transmission and a driving force is removed from the shift actuator, and means for selecting the value read by the reading means as a target value for the next shifting operation.

According to the present invention, the gear shift target value is set to the deepest gear shift position from the viewpoint of design and manufacture. At the initial gear shifting operation, the gear shift is made, the shift stroke position is sensed in a state where the detent mechanism of the transmission is stabilized. This position is adopted as the shift target value for the next shifting operation. This makes it possible to reliably prevent slipping of the gears due to an inadequate gear shifting operation caused by control based on design values.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

An embodiment of an automatic transmission shift control apparatus according to the present invention will now be described in detail with reference to the drawings.

Figure 1:
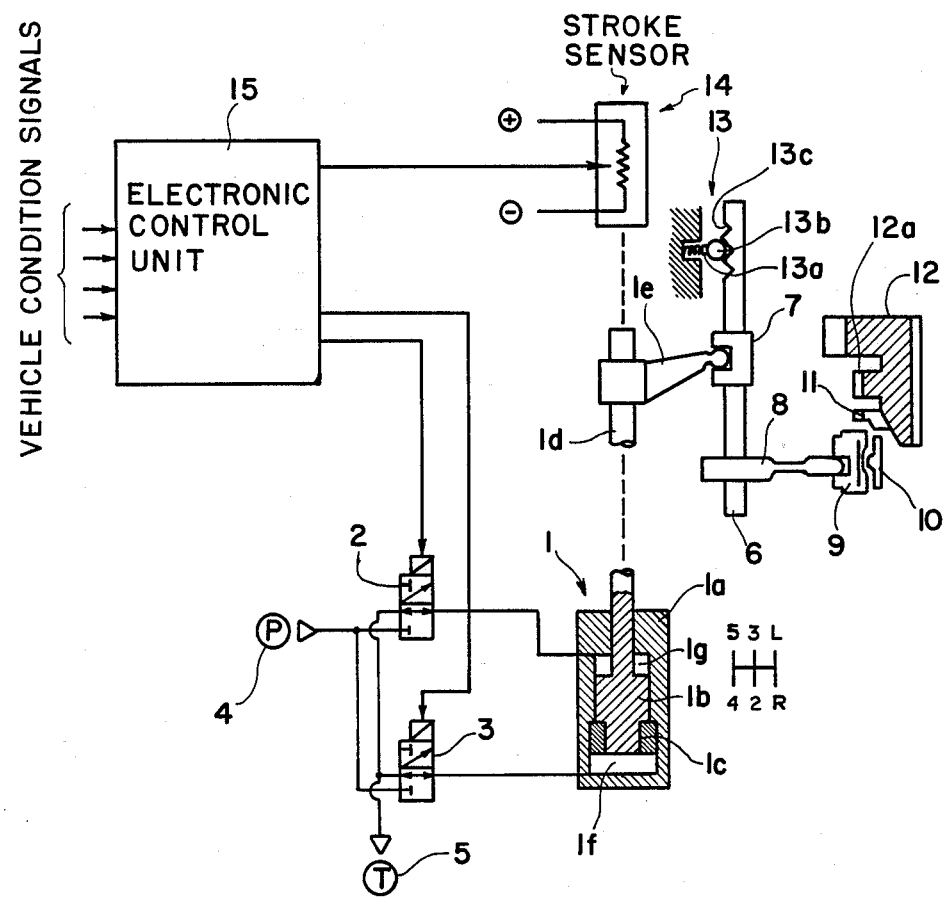
FIG. 1 is a systematic view showing an apparatus for controlling the shifting of a vehicular automatic transmission according to the present invention.

FIG. 1 is a systematic view illustrating the inventive apparatus for controlling the shifting of an automatic transmission.

In FIG. 1, a shift actuator 1, designed so as to be stoppable at any of three positions, comprises a stepped cylinder 1a, a first piston 1b, and a cylindrical second piston 1c fitted onto the first piston 1b. A gear shift lever 1e of a transmission is mounted on one end of the piston rod 1d of the first piston 1b. The piston rod 1d is in a neutral attitude when hydraulic pressure is acting upon oil chambers 1f, 1g on either side of the stepped cylinder 1a. When hydraulic pressure acts upon the oil chamber 1g, the first piston 1b is moved downward together with the second piston 1c, whereby gears are shifted to the R, 2 and 4 speed side illustrated in the schematic. When hydraulic pressure acts upon the oil chamber 1f, only the first piston is moved upward in the drawing, whereby shifting is effected to the L, 3 and 5 speed side. The magnetic valves 2, 3 operate to provide the oil chambers 1g, 1f of the actuator with either a hydraulic pressure source 4 or a tank 5.

A gear shift fork shaft 6 has a gear shift block 7 engaging with the distal end of the gear shift lever 1e. Attached to the shaft 6 is a gear shift fork 8, the distal end of which is engaged with a clutch sleeve 9. A synchro block ring 11 is moved by an insert key 10. A transmission gear 12 has a dog gear 12a meshing with the clutch sleeve 9.

A detent mecahnism 13 has a spring 13a and a steel ball 13b. For example purposes this gear shift fork shaft 6 is provided with three positioning grooves 13c corresponding to the gear shift positions L, neutral and R. The steel ball 13b is brought into pressured contact with one of these grooves 13c by the spring 13a, so that the gear shift stroke position of the gear shift fork shaft 6 is held under a constant pressure.

A stroke sensor 14 senses the stroke position of the piston rod 1d. An electronic control unit 15 is constituted by a computer having input and output devices, various memories and a central processor. Based on an output from the stroke sensor 14 and various signals indicative of engine rpm, vehicle speed, select lever and accelerator pedal positions, the electronic control unit 15 selectively actuates the gear shifting magnetic valves 2, 3 to place the shift actuator in any of the three positions mentioned above.

Figure 3:
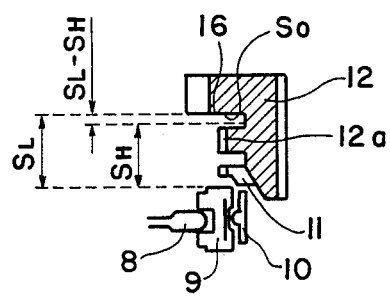
FIG. 3 is a view showing more detail of the transmission gear region of the apparatus of FIG. 1.
Figure 2:
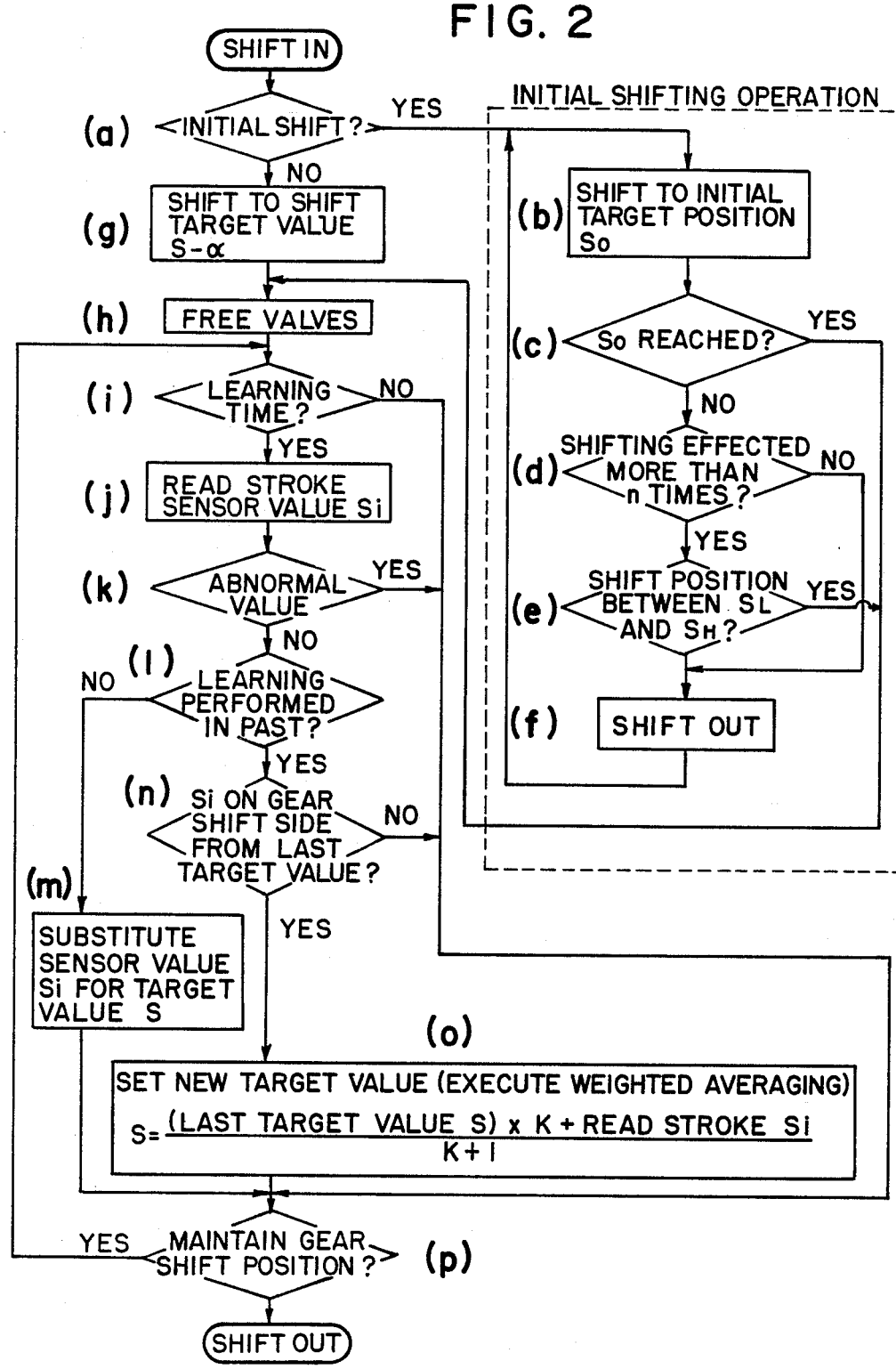
FIG. 2 is a flowchart illustrating a shift control method according to the present invention.

The operation of the shift control apparatus of the present embodiment constructed as illustrated above will now be described with reference to the flowchart of FIG. 2 and the detailed illustration of FIG. 3.

When a gear shift instruction is issued, the electronic control unit 15 executes a step (a) to determine whether the shift is an initial gear shift. This is done by checking the learned value (which will be 0 if learning has not taken place) of the gear shift stage. If it is found that learning has not yet taken place, it is decided to perform an initial gear shift.

Upon initial gear shifting, in step (b) the electronic control unit 15 makes a gear shift to the position $S_o$ (up to a gear stop 16) of a maximum stroke $S_L$ which is set for the clutch sleeve 9 to be able to move.

After the gear shift is commanded, in step (c) the electronic control unit 15 constantly reads the present value of the stroke sensor 14 to ascertain whether or not the position $S_o$ has been reached. If the position $S_o$ has not been reached within a prescribed time of $t_0$ seconds, then the electronic control unit 15 goes to a step (d), which checks whether or not a predetermined number n gear shifts have been effected. If the n gear shifts have not yet been effected, the gear shifting operation is interrupted, and the gears are shifted out of mesh in a step (f). Then, the operation returns to step (b), and a gear shift is attempted again. The above process of interrupting and effecting gear shifts repeatedly is carried out in order to prevent the clutch sleeve 9 from being caught by the block ring 11 or the dog gear 12a and hence to allow the clutch sleeve 9 to reach the maximum stroke position $S_o$ during the gear shift. When the position $S_o$ is not reached even after n gear shifts have been repeated, the electronic control unit 15 determines that the stroke of the clutch sleeve of the transmission is shorter than the maximum stroke $S_L$ that has been set on the design drawing, and proceeds to step (e).

In step (e), the electronic control unit 15 ascertains whether the present value of the stroke sensor 14 is between the maximum and minimum values ($S_L$-$S_H$) of manufacturing error range for the stroke position on the design drawing for the clutch sleeve 9. If it is confirmed that the present value of the stroke sensor 14 is between these maximum and minimum values, then the electronic control unit 15 determines that the initial gear shift has been completed. When it is found at step (c) that the $S_o$ position has been reached, or when the YES answer is obtained in step (e), learning is deemed to have occurred and subsequent processing is executed accordingly. The general features of the learning operation are described below. A more detailed discussion appears in the specification of the abovementioned Japanese Patent Application No. 59-239125.

When learning has already taken place, the electronic control unit 15 effects a gear shift to a position of a gear shift target value $S-\alpha$ [step (g)]. In other words, the electronic control unit 15 turns off the gear shift magnetic valves at a point ahead of the gear shift target position by an amount $\alpha$ (an amount that takes overshoot into consideration). This is done in anticipation of overshoot of the shift actuator 1 after the magnetic valves have been turned off and prevents the gears from being damaged by an excessive stroke. As soon as the gear shift fork shaft passes through the target value $S-\alpha$, the magnetic valves are turned off to communicate the oil chambers 1f, 1g of the shift actuator 1 with the tank 5 in order to free the actuator 1 [step (h)]. When the shift actuator 1 is thus freed, the gear shift fork shaft 6 is oscillated by the gears and is able to move freely within the detent mechanism 13. Thereafter, in step (i) it is ascertained whether or not a time period required for the steel ball 13b to fully engage in the positioning groove 13c defined in the gear shift fork 6 and become stabilized in response to movement of the detent mechanism 3 of the gear shift fork 6 has elapsed, i.e., whether or not a learning time has been reached. When the learning time has been reached, the electronic control unit 15 reads a present value Si of the gear shift stroke from the stroke sensor 14 in step (j) and compares this value with a predetermined range to judge whether the value lies within a normal stroke range [step (k)]. If an abnormality is detected, the read value is deemed to be erroneous and learning is not carried out.

If no abnormality is detected at step (k), the program proceeds to a step (l), at which it is determined whether learning has taken place in the past. If the immediately preceding gear shifting operation was an initial shift, a learned value of gear shifting does not exist [NO at step (l)]. Therefore, the present value Si of the gear shift stroke is substituted for the target value S at a step (m).

If the immediately preceding gear shifting operation was not an initial shift, or if the initial gear shift step (m) has been traversed, then learning has taken place and the currently prevailing read value Si from the stroke sensor 14 is compared with the learned value (the last target value) to determine whether Si is on the gear shift side, i.e., on the side of the maximum stroke position for the clutch sleeve 9 [step (n)]. If a YES answer is received at the step n, averaging processing is performed at a step (o) in such a manner that the gear shift stroke position furthest to the gear shift side is adopted as a target stroke for the next gear shift of this gear stage. The averaging processing is executed in accordance with the equation $$S=[(S\times K)+Si]/K+1$$

In the above equation, S on the left side is the target shift stroke position, S on the right side is the last target value, Si stands for the present shift stroke position, and K represents a weighting coefficient. Performing weighted averaging reduces the influence of reading erroneous data.

After the averaging processing is executed, it is decided in step (p) whether the gear shift position obtained as a result of such processing is to be maintained. If the decision is affirmative, then the processing from step (i) to step (p) is repeated.

According to the present invention, a gear shift target value is set to the deepest gear shift position (i.e., against the gear stop 16), from the viewpoint of design and manufacture, for the particular gear stage. This prevents inadequate and excessive gear shifting caused by control based on design values. By effecting shifting based on learning after the initial shifting operation, gear shifting can be performed reliably and safely without being influenced by variances in the dimensions of the transmission coupling mechanism, backlash, variances in the characteristics of the stroke sensor and wear of the gear shift lever and gear shift block.

Though the present invention has been described based on the illustrated embodiment, the invention is not limited solely to the embodiment. For example, though the embodiment illustrates use of a hydraulic actuator as the shift actuator, it is permissible to employ an actuator operated by pneumatic or negative pressure. Thus, the invention can be modified in various ways within the scope of the appended claims.

What I claim is:

1. A method of controlling the shifting of an automotive automatic transmission having a detent mechanism for performing shift positioning of a shift fork shaft which actuates a clutch sleeve of the transmission, a shift actuator for actuating the shift fork shaft, a stroke sensor for constantly sensing an operating position of the shift actuator, and an electronic control unit for controlling drive of the shift actuator, said method comprising:
   a first step in which the electronic control unit operates the shift actuator at an initial shifting operation of the transmission to move the shift fork shaft for each and every gear stage to the position of a maximum stroke for which said clutch sleeve is designed to move;
   a second step in which the electronic control unit removes driving force from the shift actuator at the end of said first step;
   a third step, executed at the end of said second step, in which the electronic control unit reads in a value from the stroke sensor that prevails when the detent mechanism is in a stable state; and
   a fourth step, executed at the end of said third step, in which the electronic control unit selects the read value from the stroke sensor as a target value for the next shifting operation.

2. A method according to claim 1, further comprising a fifth step in which, when the position of the maximum stroke which is designed is not attained within a predetermined period of time after a gear shifting operation starts in said second step, the electronic control unit halts the gear shifting operation and performs the gear shifting operation again.

3. A method according to claim 2, further comprising a sixth step in which the electronic control unit judges whether a present gear shift position is of a manufacturing error range for a designed stroke position for the clutch sleeve, and a seventh step in which the electronic control unit judges whether an initial gear shifting operation is completed when the present gear shift position is within the manufacturing error range, these steps being executed in a case where the position of the maximum stroke which is designed is not attained even when the gear shifting operation is repeated a predetermined number of times in said fifth step.

4. A shift control apparatus for a vehicular automatic transmission having a clutch sleeve of the transmission, a shift fork shaft which actuates the clutch sleeve, and a detent mechanism for performing shift positioning of the shift fork shaft, said shift control apparatus comprising:
   a shift actuator for actuating the shift fork shaft;
   a stroke sensor for constantly sensing an operating position of said shift actuator;
   reading means for reading in a value from said stroke sensor that prevails in a state where the detent mechanism has stabilized, this being performed after said shift actuator moves the shift fork shaft for each gear stage to the position of a maximum stroke which is designed for said clutch sleeve to move at an initial shifting operation of the transmission and a driving force is removed from said shift actuator; and
   means for selecting the value read by said reading means as a target value for the next shifting operation.

5. An apparatus according to claim 4, wherein said shift actuator is a hydraulic actuator.

6. An apparatus according to claim 4, wherein said transmission is a parallel shaft gear-type transmission.

* * * * *